US012604857B1

(12) United States Patent
Chen

(10) Patent No.: US 12,604,857 B1
(45) Date of Patent: Apr. 21, 2026

(54) FOLDING BREEDING BOX

(71) Applicant: Dong Guan ETAN Pet Supplies Co., Ltd, Dongguan (CN)

(72) Inventor: Hongqi Chen, Dongguan (CN)

(73) Assignee: Dong Guan ETAN Pet Supplies Co., Ltd, Dongguan (CN)

( * ) Notice: Subject to any disclaimer, the term of this patent is extended or adjusted under 35 U.S.C. 154(b) by 0 days.

(21) Appl. No.: 19/010,314

(22) Filed: Jan. 6, 2025

(30) Foreign Application Priority Data

Oct. 18, 2024 (CN) .......................... 202422531146.0

(51) Int. Cl.
A01K 1/03 (2006.01)

(52) U.S. Cl.
CPC ...................................... A01K 1/03 (2013.01)

(58) Field of Classification Search
CPC .......... A01K 1/03; A01K 1/031; A01K 1/032; A01K 1/033; A01K 1/034; A01K 31/08
See application file for complete search history.

(56) References Cited

U.S. PATENT DOCUMENTS

| | | | | |
|---|---|---|---|---|
| 3,494,330 A * | 2/1970 | Santagata | .............. | A01K 1/031 |
| | | | | 119/752 |
| 4,807,808 A * | 2/1989 | Reed | ...................... | A01K 1/033 |
| | | | | 229/117.02 |
| 4,869,206 A * | 9/1989 | Spina | .................... | A01K 1/033 |
| | | | | 119/479 |

| | | | | |
|---|---|---|---|---|
| 5,080,042 A * | 1/1992 | Rubin | .................. | A01K 15/024 |
| | | | | 119/706 |
| 5,452,681 A * | 9/1995 | Ho | .......................... | A01K 31/08 |
| | | | | 119/491 |
| 5,558,242 A * | 9/1996 | Kuan | ....................... | B65D 9/18 |
| | | | | 220/676 |
| 6,032,614 A * | 3/2000 | Tominaga | ................ | A01K 1/03 |
| | | | | 119/452 |
| 6,412,441 B1 * | 7/2002 | Aja | .......................... | A01K 1/031 |
| | | | | 119/416 |
| 6,460,486 B1 * | 10/2002 | Powers | .................. | A01K 31/08 |
| | | | | 119/474 |
| 6,832,580 B2 * | 12/2004 | Marchioro | ............... | A01K 1/03 |
| | | | | D30/114 |
| 7,938,085 B1 * | 5/2011 | Tsengas | ................. | A01K 1/034 |
| | | | | 119/474 |
| 8,522,724 B2 * | 9/2013 | Murrer | ................. | A01K 15/027 |
| | | | | 119/706 |
| 9,095,120 B1 * | 8/2015 | Skaggs | ................ | A01K 1/0245 |
| 9,485,957 B2 * | 11/2016 | Kellogg | ................ | A01K 1/034 |
| 9,572,306 B2 * | 2/2017 | Chiang | .................. | A01G 9/023 |
| 10,492,463 B2 * | 12/2019 | Deraps | ................. | A01K 15/027 |
| 11,523,587 B1 * | 12/2022 | Bellman | .................. | A01K 1/03 |

* cited by examiner

*Primary Examiner* — William L Gmoser
(74) *Attorney, Agent, or Firm* — JEEN IP LAW, LLC

(57) ABSTRACT

The embodiment of the present disclosure provides a folding breeding box with its structure simplified, including a base, a rear panel, a left panel, a right panel, a top frame, a top panel and four mounting strips; the four mounting strips are hinged on the top of the base; both sides of the left panel are respectively fitted in slots of one of the mounting strips in the front and one of the mounting strips at the rear; both sides of the right panel are respectively fitted in slots of other two mounting strips; both sides of the rear panel are respectively fitted in slots of the two mounting strips at the rear; the top frame is fitted to the four mounting strips; the top panel is mounted to the inside of the top frame.

9 Claims, 13 Drawing Sheets

FOLDING BREEDING BOX

TECHNICAL FIELD

The present disclosure relates to the field of breeding boxes, and particularly relates to a folding breeding box.

BACKGROUND

With the enrichment of people's life and the continuous decreasing of needs in emotions, pets are playing an increasingly important role in people's life. The most common pets, such as cats and dogs, are no longer just for catching mouse or housekeeping conventionally, but for communication with people as a soul connection. Therefore, more and more families now like to keep pets, which are usually kept in breeding boxes.

A breeding box in a prior art includes a base, a rear frame, a first side frame, a second side frame and a front frame strip; lower ends of the rear frame, the first side frame, and the second side frame are respectively hinged to the rear, left and right sides of an upper end of the base in a manner of being reversible from inside out through a hinge assembly. The front frame strip is mounted above a front side of the base; the front frame strip is respectively fitted on the first side frame and the second side frame on both ends of the front frame strip. The folding breeding box further includes a rear panel, a first side panel and a second side panel; the rear panel, the first side panel and the second side panel are respectively plugged into slots in an inner side of the rear frame, the first side frame, and the second side frame.

However, there is still possible improvement in the above-mentioned folding breeding box. For example, the overall structure of the folding breeding box is relatively complex, which increases its production cost to a certain extent.

Therefore, it is necessary to improve such technologies in the prior art.

SUMMARY

In view of the above disadvantages in the prior art, the present disclosure is intended to provide a folding breeding box, which has a simplified structure, so that a production cost of the breeding box may be reduced to a certain level.

In order to achieve the above objects, the technical solution of the present disclosure is as follows:

A folding breeding box, including a base, a rear panel, a left panel, a right panel, a top frame, a top panel and four mounting strips; lower ends of the four mounting strips are respectively hinged at four corner positions on top of the base through a hinge assembly, and the mounting strips are reversible to left and right, respectively; rear sides of two mounting strips located in the front of the folding breeding box are each provided with a slot; two mounting strips located at the rear of the folding breeding box are also provided with slots on opposite sides and a front side thereof; both sides of the left panel are respectively fitted in two slots at corresponding positions of one of the mounting strips in the front and one of the mounting strips at the rear; both sides of the right panel are respectively fitted in two slots at corresponding positions of the other of the two mounting strips in the front and the other of the two mounting strips at the rear; both sides of the rear panel are respectively fitted in two opposite slots of the two mounting strips at the rear; the top frame is detachably fitted on top of the four mounting strips; the top panel is detachably mounted to the inside of the top frame. The structure of the breeding box may be simplified with the above arrangement and the production cost of the breeding box may be decreased to a certain extent.

Further, a positioning frame may be mounted around the top panel; two lock rods may be provided on front and back sides of the positioning frame respectively, the two lock rods are located on the left and right and movable in left and right in an outward direction; four lock holes are evenly provided inside of the top frame and on both sides of the top frame to operate with the four lock rods respectively; an end of the lock rod may be inserted into the lock hole or detached from the lock hole correspondingly by pushing the lock rod outward or pulling the lock rod inward, so that the top panel may be disassembled and assembled conveniently and quickly.

Further, when the two lock rods located in the front or the two lock rods located at the rear are inserted into two lock holes corresponding thereto, the two lock rods corresponding to the two lock holes may form a hinge point respectively, and enable the positioning frame and the top panel to be reversible up and down.

Further, the top frame includes a "⊓"-shaped main body with an opening facing forward, and a retaining strip detachably mounted on a front end of the main body; inserting slots may be provided on the inner circumference of the top frame and communicated with each other. The top panel may be correspondingly inserted into the inserting slot around the top frame; the top panel may be easily inserted or removed from the inserting slot when the retaining strip is removed.

Further, a first threaded hole may be provided at each of four corners of the top frame; a second threaded hole corresponding to the first threaded hole may be provided at each of four corners of the top panel; each of the first threaded holes and the second threaded hole corresponding thereto may be connected by bolts. The top panel may be positioned stably with the above configuration.

Further, a positioning frame may be mounted around the top panel; at least one hook with deformation elasticity may be provided on the front and rear sides of the positioning frame respectively; the positioning frame may abut against circumference of the top frame, and may be hooked on the top frame by a hooking part of each hook; the hook may be released by pushing a top of the hook. The top panel may be easily and quickly disassembled and assembled with such configuration.

Further, a lower end of an inner side of the circumference of the top frame may be used as a limit strip; the limit strip may abut against a circumference of the positioning frame, and the hook part of the hook may be correspondingly hooked on a bottom of the limit strip. The positioning frame may be conveniently supported by the limit strip, and the hook may also be used conveniently.

Further, the folding breeding box further includes a first front panel and a second front panel; upper and lower ends of outer sides of the first front panel and the second front panel are respectively hinged to the top frame and the base on the front sides thereof, so that the first front panel and the second front panel may be reversible back and forth for opening state or locking state.

Furthermore, a mechanical lock that may be used to lock or unlock the first front panel and the second front panel may be further provided on the base, so as to facilitate the locking state or open-to-use state of the first front panel and the second front panel.

Furthermore, the rear panel includes two pieces; a connecting strip with slots on both sides may be provided between the two rear panels; one sides of the two rear panels may be inserted into two corresponding slots of the connecting strip respectively, and a lower end of the connecting strip is detachably inserted into a positioning slot of the base. With the above configuration, problems such as being easy to damage or being difficult in moving due to the back panel being too large may be avoided.

The present disclosure has the following beneficials:

In the present disclosure, four mounting strips configured to be reversible are directly provided on the base, and then the rear panel, the left panel and the right panel corresponding thereto are respectively mounted at corresponding positions between the four mounting strips, so that it is unnecessary for the rear panel, the left panel, and the right panel to be provided with corresponding rear frames and two side frames. That is to say, it is unnecessary for the rear panel, the left panel and the right panel to enclose the circumference before assembling. The structure or the like of each panel are simple under such configuration. On the other hand, since the structure of the mounting strip is simpler than that of the rear frame and side frame, the structure of the breeding box is simplified compared to the breeding box in the prior art, and production costs may be reduced to a certain extent and the breeding box of the present disclosure is highly practical.

Figure 1:
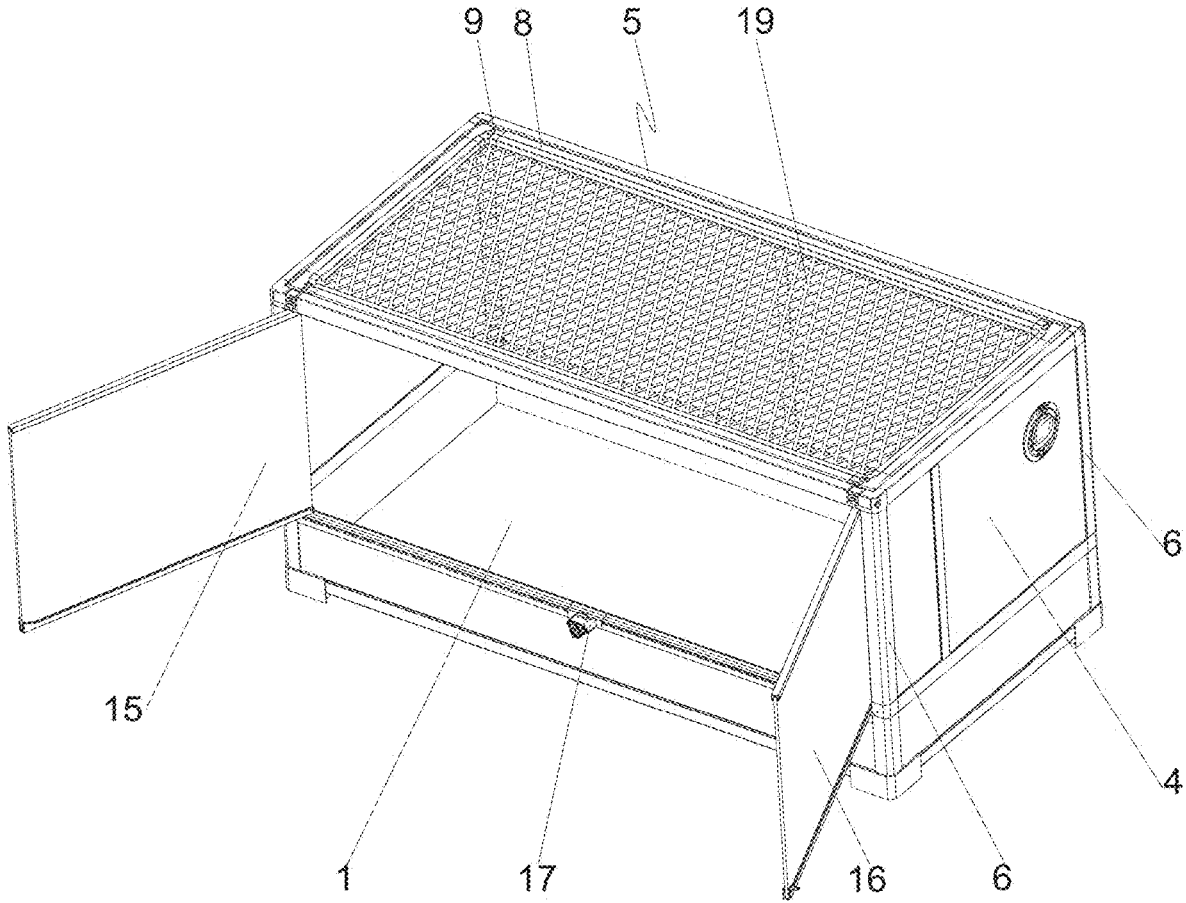
FIG. 1 is a first schematic view of a whole structure of a first embodiment of the present disclosure.

REFERENCE NUMBERS 1. base; 2. rear panel; 3. left panel; 4. right panel; 5. top frame; 51. main body; 52. retaining strip; 53. inserting slot; 6. mounting strip; 61. hinge assembly; 7. slot; 8. positioning frame; 9. lock rod; 10. lock hole; 11. first threaded hole; 12. second threaded hole; 13. hook; 14. limit strip; 15. first front panel; 16. second front panel; 17. mechanical lock; 18. connecting strip; 19. top panel.

DETAILED DESCRIPTION

The disclosure will be further described below with reference to the drawings and specific embodiments. The following description is only exemplary and does not limit the scope of the disclosure.

First Embodiment

As shown in FIGS. 1 to 5, a folding breeding box with includes a base 1, a rear panel 2, a left panel 3, a right panel 4, a top frame 5, a top panel 19 and four mounting strips 6.

In the present embodiment, lower ends of the four mounting strips 6 are respectively hinged at four corner positions on top of the base 1 through a hinge assembly 61, and mounting strips 6 are reversible to left and right. Therefore, with each hinge 61 provided, the four mounting strips 6 may be reversible respectively. For example, the four mounting strips 6 may be reverted down toward the middle of the base 1 respectively, so as to implement a folding action. In order to ensure the effect in use, a length of each mounting strip 6 may be less than half of a width between left and right sides of the base 1, so that the four mounting strips 6 may be stacked horizontally on the base 1 to reduce a volume of the breeding box in a fold state.

The hinge 61 has a structure as disclosed in the prior art, and thus detailed description would be omitted herein to avoid redundancy.

Preferably, rear sides of two mounting strips 6 located in the front of the folding breeding box are each provided with a slot 7; two mounting strips 6 located at the rear of the folding breeding box are also provided with slots 7 on opposite sides and a front side thereof.

Figure 2:
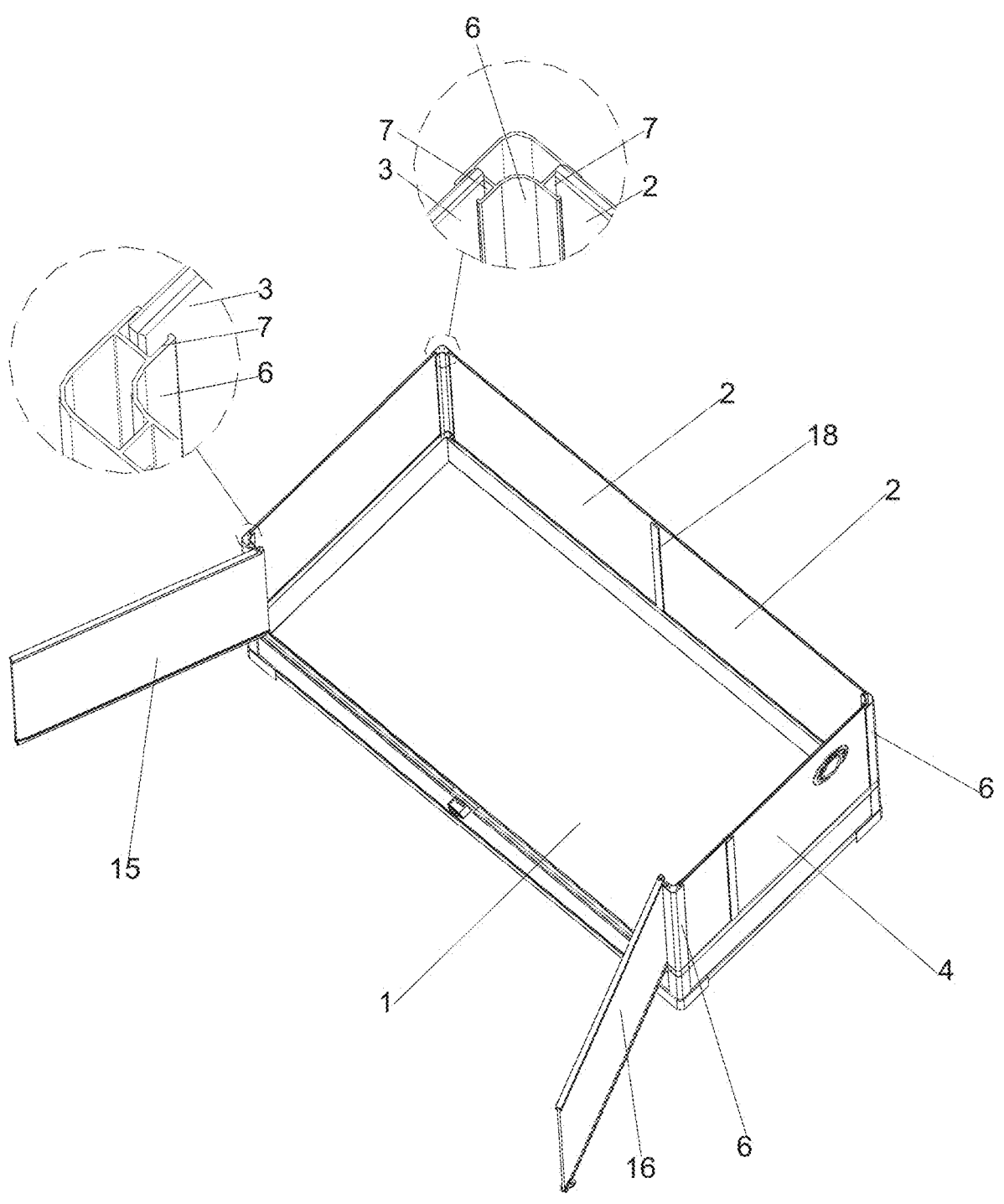
FIG. 2 is a first schematic view of a partial structure of the first embodiment of the present disclosure.
Figure 3:
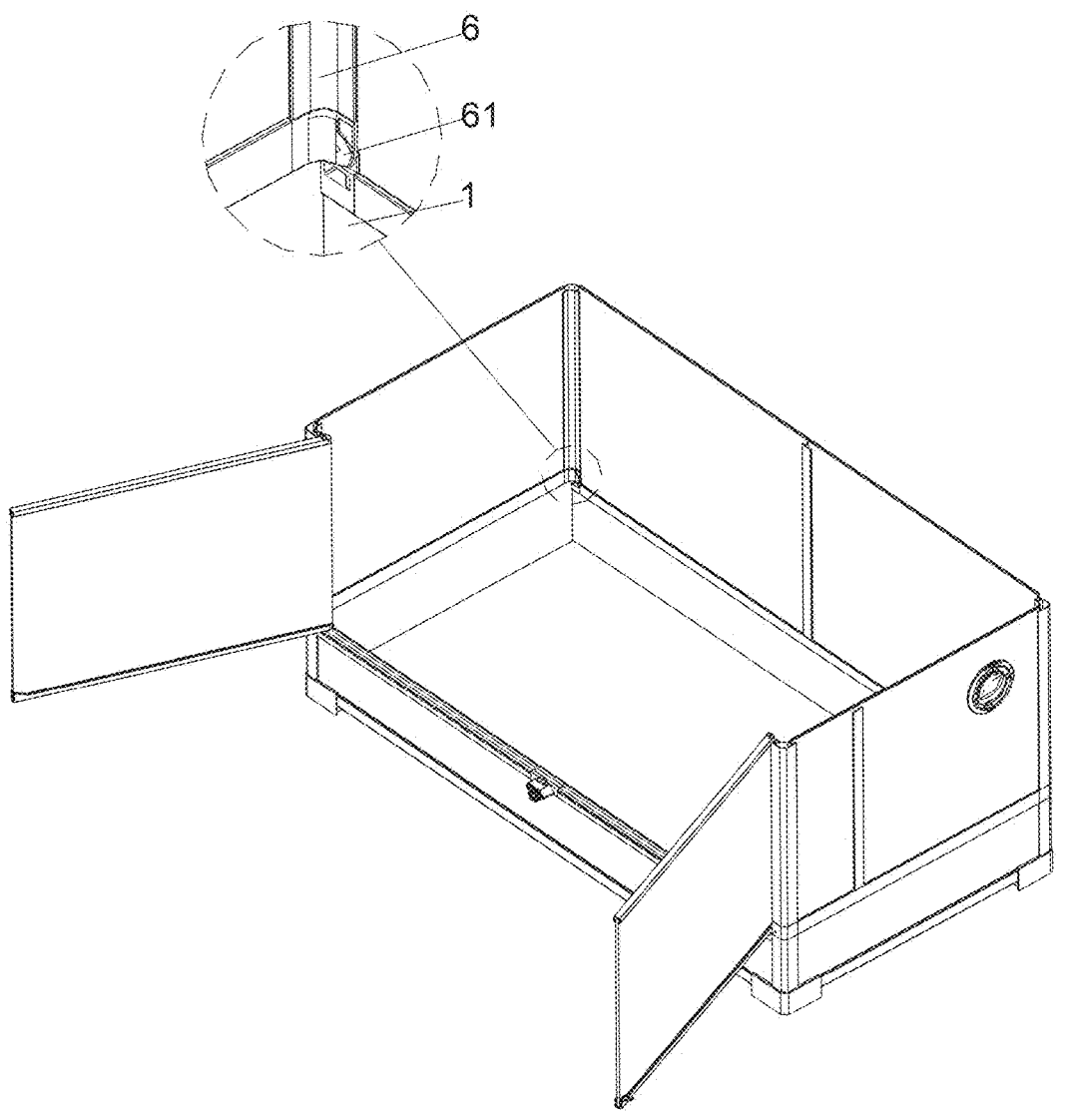
FIG. 3 is a second schematic view of a partial structure of the first embodiment of the present disclosure.

As shown in FIGS. 2 and 3, the left panel 3, the right panel 4, and the rear panel 2 may be assembled as follows: both sides of the left panel 3 are respectively fitted in two slots 7 at corresponding positions of one of the mounting strips 6 in the front and one of the mounting strips 6 at the rear; both sides of the right panel 4 are respectively fitted in two slots 7 at corresponding positions of the other of the two mounting strips 6 in the front and the other of the two mounting strips 6 at the rear; both sides of the rear panel 2 are respectively fitted in two opposite slots 7 of the two mounting strips 6 at the rear. The left panel 3, the right panel 4, and the rear panel 2 may be mounted in position in a way as described above.

Figure 4:
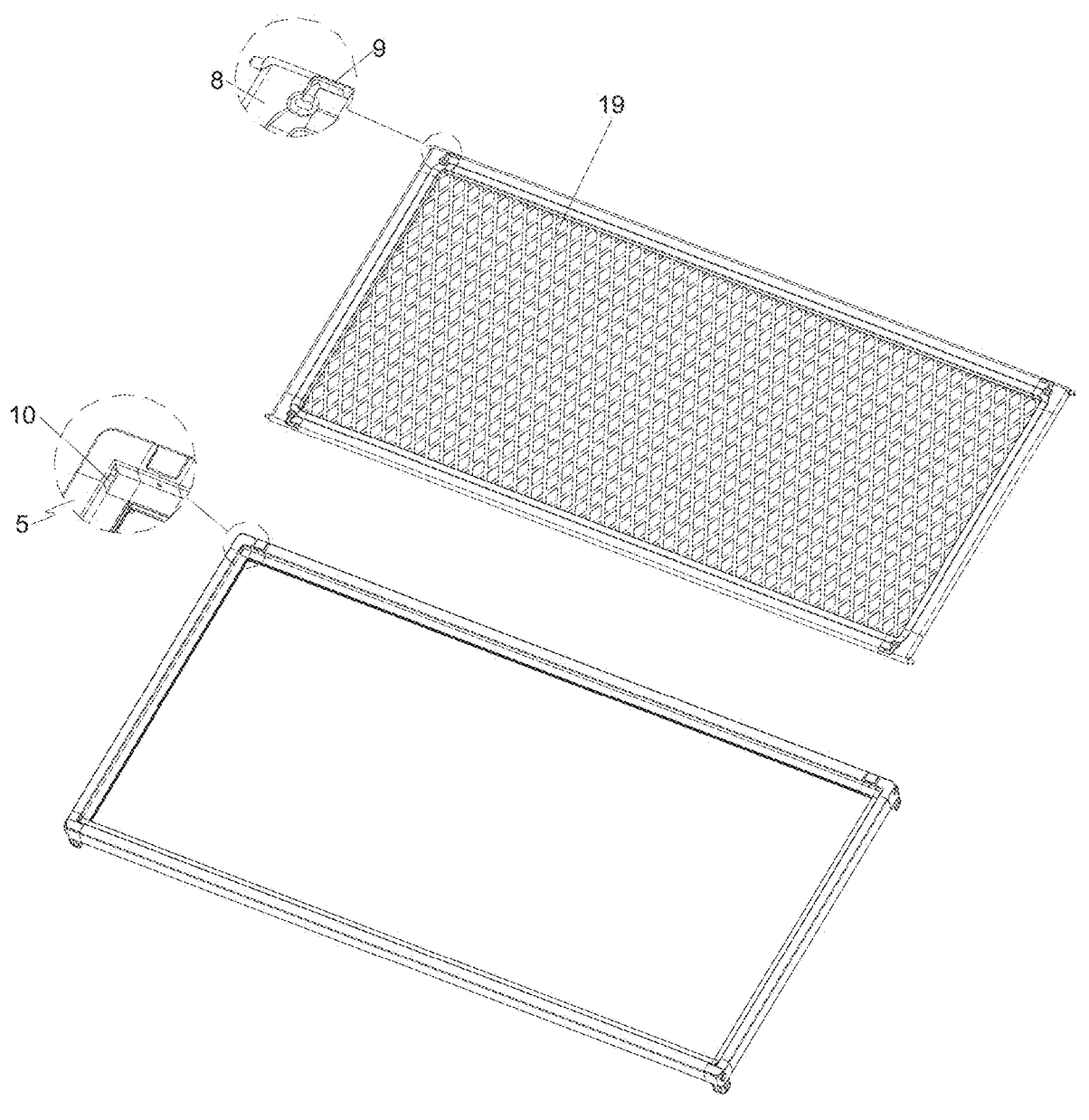
FIG. 4 is a third schematic view of a partial structure of the first embodiment of the present disclosure.
Figure 5:
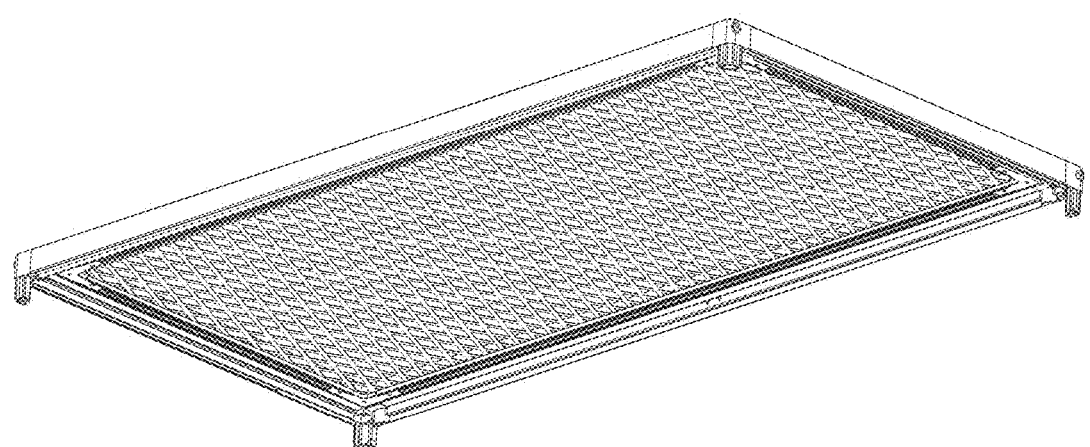
FIG. 5 is a fourth schematic view of a partial structure of the first embodiment of the present disclosure.

As shown in FIGS. 2 to 5, the top frame 5 may be mounted as follows: the top frame 5 is detachably fitted on top of the four mounting strips 6; the top panel 19 is detachably mounted to the inside of the top frame 5. The structure of the breeding box may be simplified with the above arrangement and the production cost of the breeding box may be decreased to a certain extent. As shown in FIGS. 2, 3 and 5, the top frame 5 may be mounted in a specific way as follows: an insert block (not shown in the drawings) may be respectively provided at each of four corners of a bottom surface of the top frame 5; each insert block may be inserted into the top of the four mounting strips 6 in a way of interference fitting, so that the top frame 5 may be mounted in position. The top frame 5 may be just pulled out in disassembling.

Therefore, in the present disclosure, four mounting strips 6 configured to be reversible are directly provided on the base 1, and then the rear panel 2, the left panel 3 and the right panel 4 corresponding thereto are respectively mounted at corresponding positions between the four mounting strips 6, so that it is unnecessary for the rear panel 2, the left panel 3, and the right panel 4 to be provided with corresponding rear frames and two side frames. That is to say, it is unnecessary for the rear panel 2, the left panel 3 and the right panel 4 to enclose the circumference before assembling. The structure or the like of each panel are simple under such configuration. On the other hand, since the structure of the mounting strip 6 is simpler than that of the rear frame and side frame, the structure of the breeding box is simplified compared to the breeding box in the prior art, and production costs may be reduced to a certain extent and the breeding box of the present disclosure is highly practical.

As shown in FIGS. 1, 4 and 5, in the present embodiment, the top panel 19 may be mounted as follows: a positioning frame 8 may be mounted around the top panel 19; two lock rods 9 may be provided on front and back sides of the positioning frame 8 respectively, the two lock rods 9 are located on the left and right and movable in left and right in an outward direction; four lock holes 10 are evenly provided inside of the top frame 5 and on both sides of the top frame 5 to operate with the four lock rods 9 respectively; an end of the lock rod 9 may be inserted into the lock hole 10 or detached from the lock hole 10 correspondingly in use by pushing the lock rod 9 outward or pulling the lock rod 9 inward. More particularly, the top panel 19 and the positioning frame 8 may be taken out in an upper direction upon the four lock rods 9 are pulled inward respectively, while the top panel 19 and the positioning frame 8 may be taken out in an upper direction upon the four lock rods 9 are mounted in position upon the four lock rods 9 are inserted into the four lock holes 10 respectively. As shown in FIGS. 1, 4 and 5, in addition, the lock rods 9 as mentioned above may be mounted in another way as follows: when the two lock rods 9 located in the front or the two lock rods 9 located at the rear are inserted into two lock holes 10 corresponding thereto, the two lock rods 9 corresponding to the two lock holes 10 may form a hinge point respectively, and enable the positioning frame 8 and the top panel 19 to be reversible up and down. Therefore, if the two lock rods 9 in the front or the two lock rods 9 at the rear are inserted into the two lock holes 10 corresponding thereto, and the other two lock rods 9 are in an unlocked state, the top panel 19 and the positioning frame 8 may be reversible up and down, that is to say, upon the top panel 19 and the positioning frame 8 are reverted upward, an open state may be formed to facilitate people to feed food to the animals in the base 1 and so on.

As shown in FIGS. 1 to 3, for convenience of use, the breeding box provided in the present disclosure may further include a first front panel 15 and a second front panel 16; upper and lower ends of outer sides of the first front panel 15 and the second front panel 16 are respectively hinged to the top frame 5 and the base 1 on the front sides thereof, so that the first front panel 15 and the second front panel 16 may be reversible back and forth for opening state or locking state. A front side of the breeding box may be sealed conveniently with such configuration, and on the other hand, the first front panel 15 and the second front panel 16 may also be opened easily. The first front panel 15 and the second front panel 16 may be provided as follows: a rotation column may be respectively provided at each of the upper and lower ends of outer sides of the first front panel 12 and the second front panel 13, and then hinge holes may be respectively provided at positions on the front frame 5 and the base 1 corresponding to the rotation columns, so that hinges may be implemented by inserting the rotation columns into the hinge holes.

As shown in FIG. 1, a mechanical lock 17 that may be used to lock or unlock the first front panel 15 and the second front panel 16 may be further provided on the base 1, so as to facilitate the locking state or open-to-use state of the first front panel 15 and the second front panel 16.

As shown in FIGS. 1 to 3, preferably, in order to facilitate transportation, the rear panel 2 may include two pieces; a connecting strip 18 with slots 7 on both sides may be provided between the two rear panels 2; one side of each of the two rear panels 2 may be inserted into two corresponding slots 7 of the connecting strip 18 respectively, and a lower end of the connecting strip 18 is detachably inserted into a positioning slot of the base 1. With the above configuration, problems such as being easy to damage or being difficult in moving due to the back panel being too large may be avoided.

As shown in FIGS. 1 to 3, in the present embodiment, the top panel 19 is a mesh plate, and the rear plate 2, the left plate 3 and the right plate 4 are all glass plates.

When a buyer assembles the breeding box, the buyer may firstly pull the four pre-assembled mounting strips 6 to preset positions; then he may mount the two rear panels 2, connecting strips 18, left panel 3 and right panel 4 among the four mounting strips 6 correspondingly; in the next step, he may mount the first front panel 15, the second front panel 16 and the top frame 5 in position sequentially; then he may push the lock rods 9 on the positioning frame 8 with the top panel 19 assembled in advance outward so that they may be inserted outwards into the four lock holes 10, respectively, so that the positioning of the top panel 19 may be completed. The entire breeding box may be completed with above assembling steps. The assembly process is very easy, so as to greatly increase the buyer's assembly efficiency and decrease the difficulty in assembly. Of course, when the rear panel 2, the left panel 3 and the right panel 4 are to be detached, the top frame 5 may be removed first, and then the rear panel 2, the left panel 3 and the right panel 4 may be taken out. When the top panel 19 is to be detached, each lock rod 9 may be pushed inward so that the top panel 19 and the positioning frame 8 may be taken out. Therefore, the four mounting strips 6 may be then folded inward respectively to decrease the volume of the breeding box so that the transportation or storage, and the like may be easy.

Second Embodiment

As shown in FIGS. 6 to 9, the breeding box provided in the embodiment and the one provided in the first embodiment is the same except that in the present embodiment, the top frame includes a "冂"-shaped main body 51 with an opening facing forward, and a retaining strip 52 detachably mounted on a front end of the main body 51; inserting slots 53 may be provided on the inner circumference of the top frame 5 and communicated with each other; the top panel 19 may be correspondingly inserted into the inserting slot 53 around the top frame 5; and thus inserting slots 53 may be also provided on the retaining strip 52 to restrain the top panel 19. The top panel 19 may be inserted or removed from the inserting slots 53 when the retaining strip 52 is removed. Therefore, in the present embodiment, the top panel 19 may be provided without the positioning frame 8 and the lock rod 9 around, and the top frame 5 may be provided without the lock hole 9, and so on. The structures of the rest components, such as rear panel 2, the left panel 3, the right panel 4, the first front panel 15, the second front panel 16, and the mounting strip 6, etc., are same as in the first embodiment, and related description may be omitted to avoid redundancy.

Figure 6:
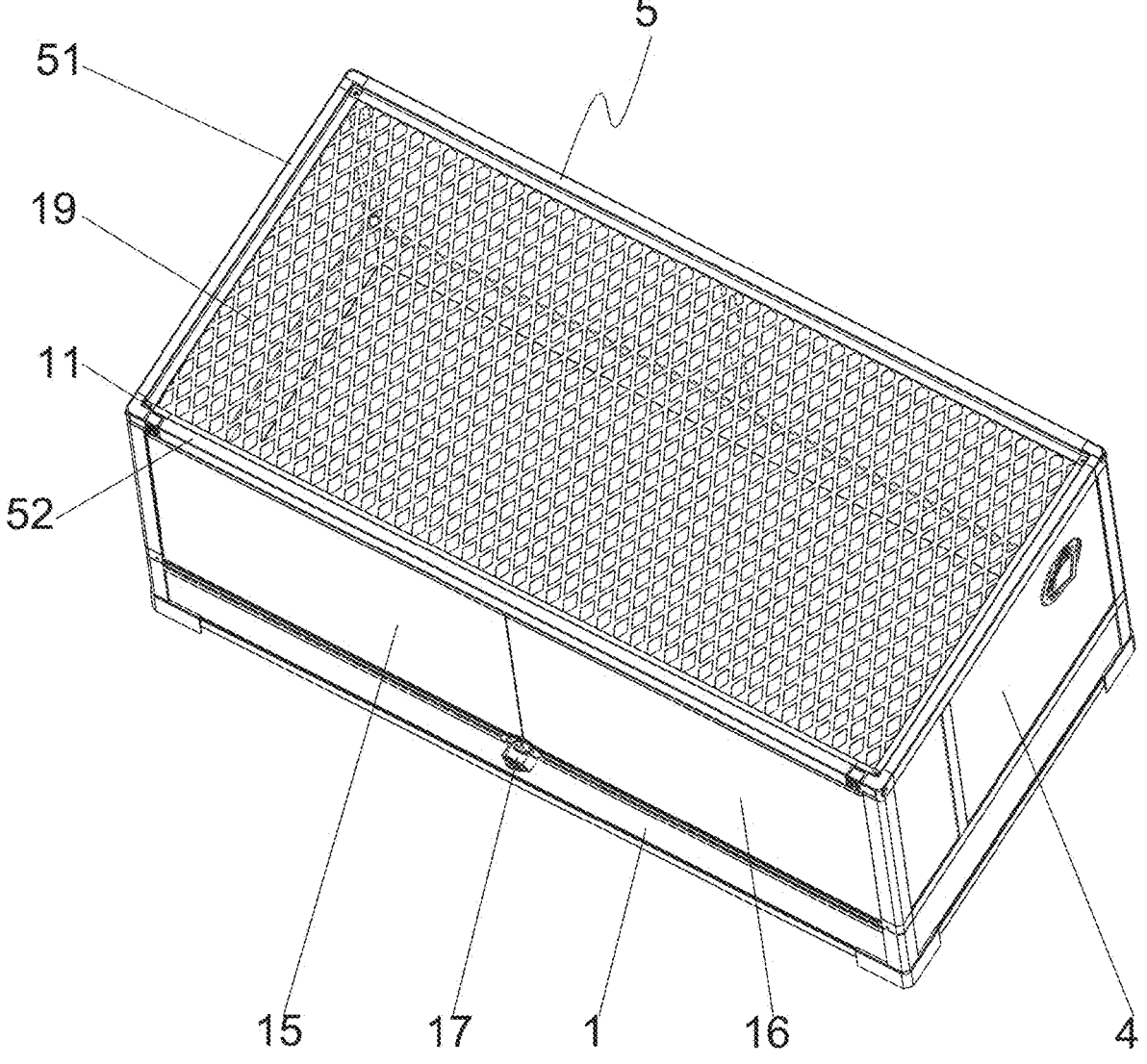
FIG. 6 is a first schematic view of a whole structure of a second embodiment of the present disclosure.
Figure 7:
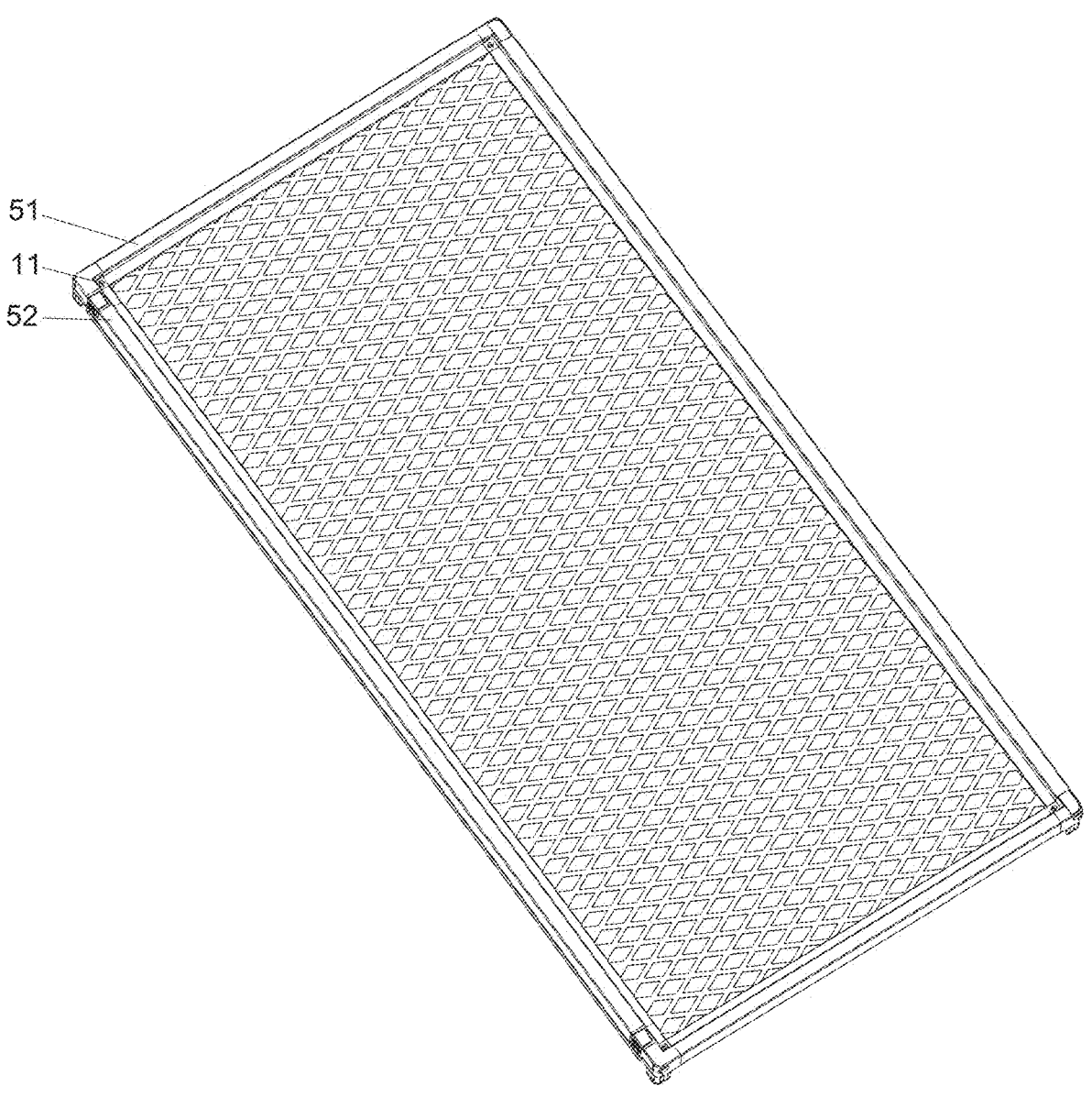
FIG. 7 is a first schematic view of a partial structure of the second embodiment of the present disclosure.
Figure 8:
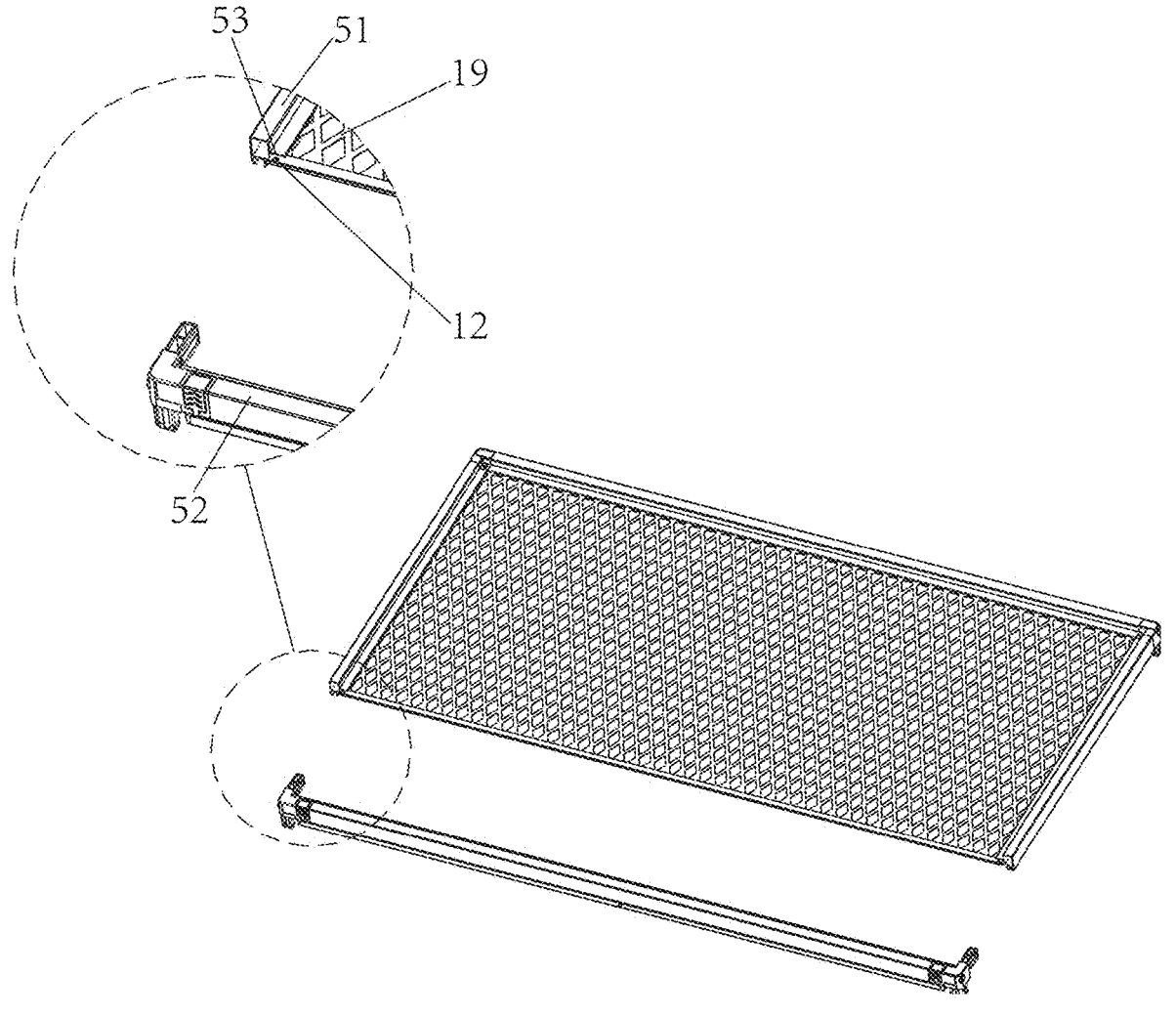
FIG. 8 is a second schematic view of a partial structure of the second embodiment of the present disclosure.

As shown in FIGS. 6-8, preferably, a first threaded hole 11 may be provided at each of four corners of the top frame 5;

a second threaded hole 12 corresponding to the first threaded hole 11 may be provided at each of four corners of the top panel 19; each of the first threaded holes 11 and the second threaded hole 12 corresponding thereto may be connected by bolts. The top panel 5 and the top panel 19 may be positioned stably with bolts in the above configuration, to prevent them from loosening.

Figure 9:
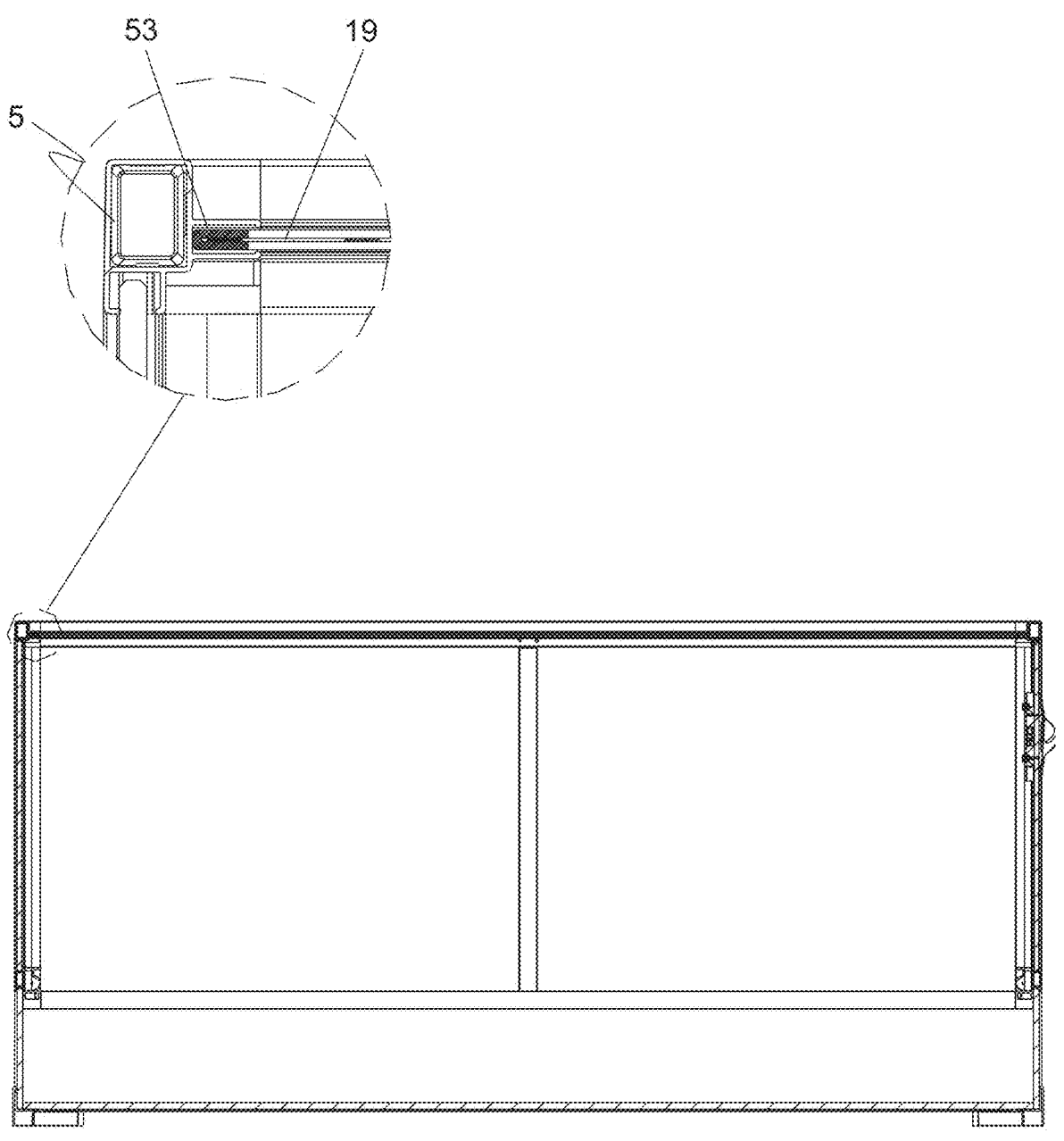
FIG. 9 is a longitudinal cross-sectional view of the second embodiment of the present disclosure.

As shown in FIGS. 7 to 9, the main body 51 and the retaining strip 52 may be connected as follows: a socket (not shown in the drawings) may be provided at each of both ends of the main body 51, and an inserting block (not shown in the drawings) may be provided at each of the both ends of the retaining strip 52.

During using, for example, when the retaining strip 52 is to be removed, the retaining strip 52 may be pulled out, and then the top panel 19 may be inserted or taken out, and then all the bolts may be connected after the top panel 19 is inserted, and then the top panel 19 may be fixed properly. Finally, two inserting blocks may be inserted into the sockets in interference fitting to complete the mounting of the retaining strip 52. The mounting process is simple and easy.

Third Embodiment

As shown in FIGS. 10-13, the breeding box provided in the embodiment and the one provided in the first embodiment is the same except that in the present embodiment, a positioning frame 8 may be also mounted around the top panel 19; at least one hook 13 with deformation elasticity may be provided on the front and rear sides of the positioning frame 8 respectively; the positioning frame 8 may abut against circumference of the top frame 5, and may be hooked on the top frame 5 by a hooking part of each hook 13; the hook 13 may be released by pushing the top of the hook 13. That is to say, the top of the hook 13 may be connected to the hooking part (not shown in the drawings) of the hook 13 and both have the elasticity for deformation on some level. Therefore, in the present embodiment, the top panel 19 may be provided without the lock rod 9 around, and the top frame 5 may be provided without the lock hole 9, and so on. The structures of the rest components, such as rear panel 2, the left panel 3, the right panel 4, the first front panel 15, the second front panel 16, and the mounting strip 6, etc., are same as in the first embodiment, and related description may be omitted to avoid redundancy.

Figure 11:
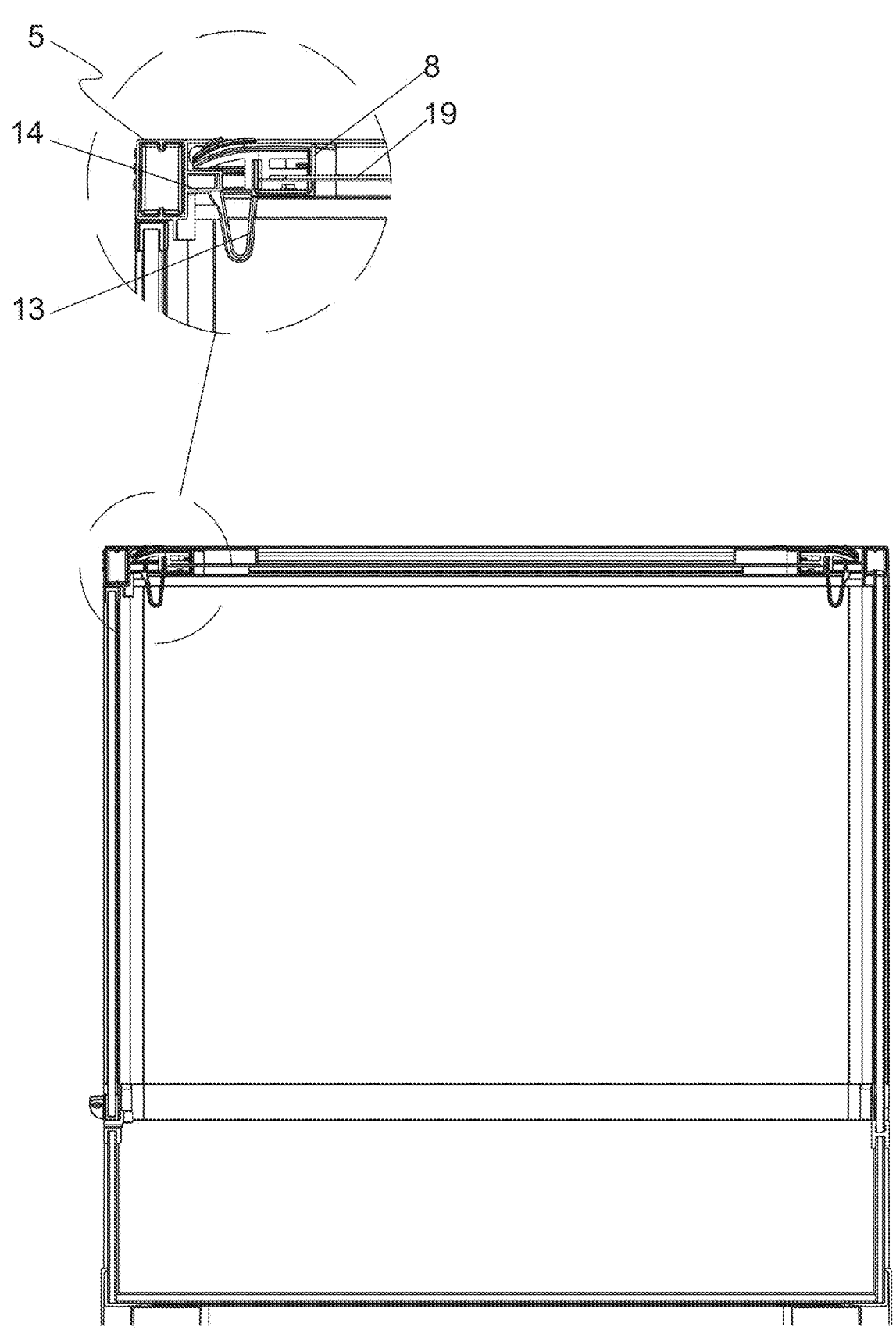
FIG. 11 is a longitudinal cross-sectional view of the third embodiment of the present disclosure.
Figure 12:
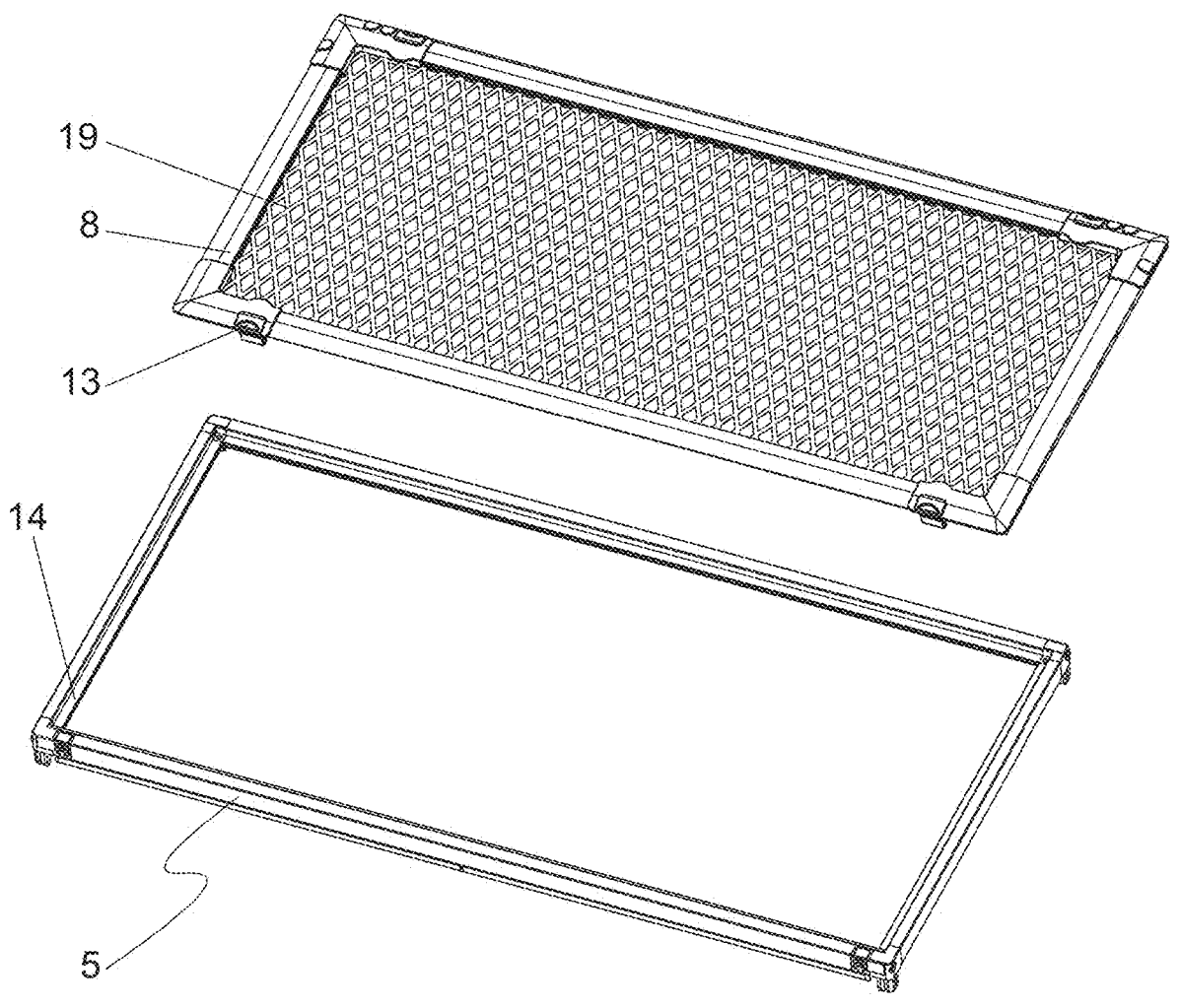
FIG. 12 is a first schematic view of a partial structure of the third embodiment of the present disclosure.

As shown in FIGS. 11 and 12, specifically, a lower end of an inner side of the circumference of the top frame 5 may be used as a limit strip 14; the limit strip 14 may abut against a circumference of the positioning frame 8 correspondingly, so as to decrease a height of the protrusion generated after the positioning frame 8 is mounted, and the hook part of the hook 13 may be correspondingly hooked on a bottom of the limit strip 14.

Figure 10:
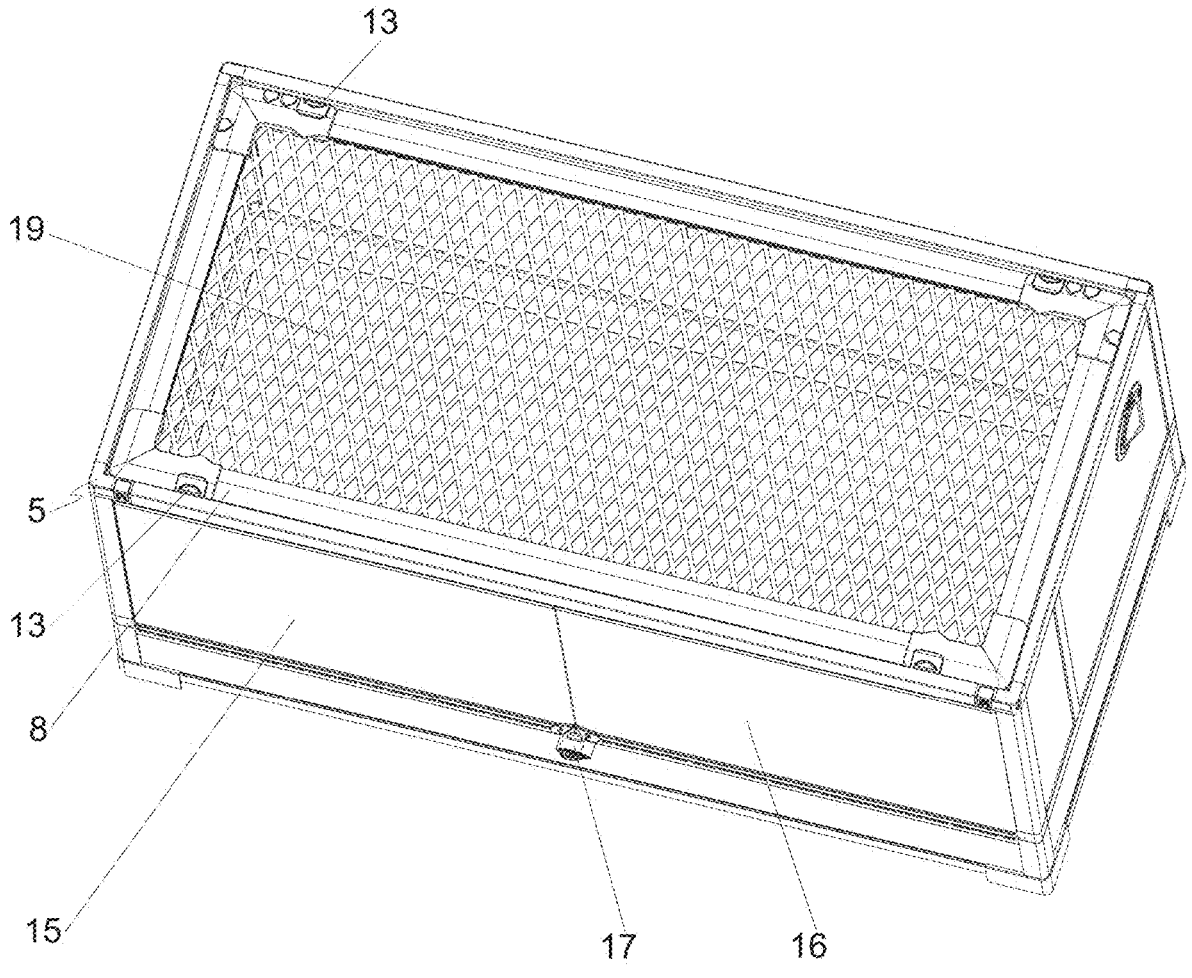
FIG. 10 is a schematic view of a whole structure of a third embodiment of the present disclosure.
Figure 13:
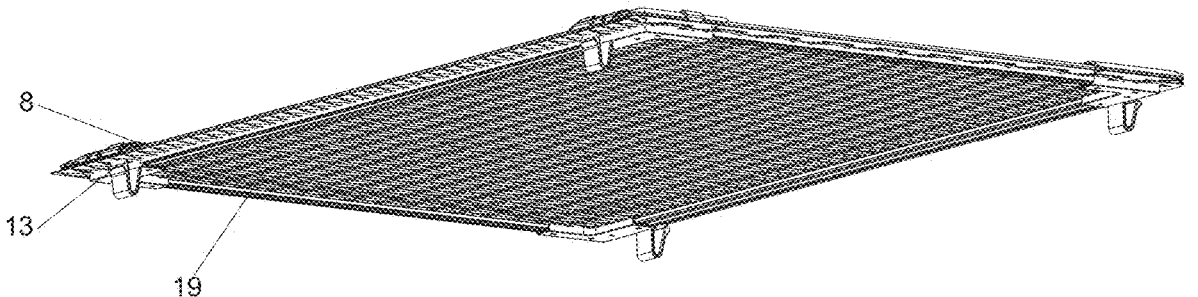
FIG. 13 is a second schematic view of a partial structure of the third embodiment of the present disclosure.

As shown in FIGS. 10, 12 and 13, preferably, in order to improve a stability of the top panel 19, two hooks 13 may be respectively provided on the front and rear sides of the positioning frame 8, and four hooks 13 may be located at four corner positions of the positioning frame 8.

The hook 13 has a structure as disclosed in the prior art, and thus detailed description would be omitted herein to avoid redundancy.

During using, the positioning frame 8 provided with the top panel 19 may be placed on the limit strip 14, and the hooking part of hook 13 may hook the limit strip 14 on the bottom surface thereof by using the elasticity for deformation of the hook 13 during the downward placing, so that the positioning frame 8 and the top panel 19 may be mounted in position. When the positioning frame 8 and the top panel 19 are intended to be detached, the top of two hooks 13 on the same side may be pushed inward, so as to swing the hooking part of the hook 13 inward, so that the hooking part may be detached from the limit strip 14, and thus, the positioning frame 8 may be lifted at the same time when the hook 13 are lifted. Similarly, the positioning frame 8 on the other side may be detached in the same way, and the top panel 19 may be detached correspondingly after the positioning frame 8 is detached.

The present disclosure is not limited to the above-described embodiments. Various changes or deformations can be made to the present disclosure without departing from the spirit and scope of the present disclosure, and if these changes and deformations fall within the claims and equivalent scope of the present disclosure, these modifications and variations are intended to be included in the present disclosure.

What is claimed is:

1. A folding breeding box, comprising:
    a base, a rear panel, a left panel, a right panel, a top frame, a top panel and four mounting strips;
    lower ends of the four mounting strips are respectively hinged at four corner positions on a top of the base by a hinge assembly, and the mounting strips are reversible to left and right, respectively;
    rear sides of two mounting strips located in a front of the folding breeding box are each provided with a slot; two mounting strips located at a rear of the folding breeding box are also provided with slots on opposite sides and a front side thereof;
    both sides of the left panel are respectively fitted in two slots at corresponding positions of one of the mounting strips in a front and one of the mounting strips at a rear; both sides of the right panel are respectively fitted in two slots at corresponding positions of the other of the two mounting strips in a front and the other of the two mounting strips at a rear; both sides of the rear panel are respectively fitted in two opposite slots of the two mounting strips at a rear;
    the top frame is detachably fitted on tops of the four mounting strips; the top panel is detachably mounted to an inside of the top frame;
    wherein a positioning frame is mounted around the top panel; two lock rods are provided on front and rear sides of the positioning frame respectively, the two lock rods are located on left and right and movable in the left and right in an outward direction; four lock holes are provided inside of the top frame and on both sides of the top frame to operate with the lock rods respectively;
    ends of the lock rods are inserted into the lock holes or detached from the lock holes correspondingly by pushing the lock rods outward or pulling the lock rods inward.

2. The folding breeding box according to claim 1, wherein when the two lock rods located in the front or the two lock rods located at the rear are inserted into two lock holes corresponding thereto, the two lock rods corresponding to the two lock holes form a hinge point respectively, and enable the positioning frame and the top panel to be reversible up and down.

3. The folding breeding box according to claim 1, wherein the top frame comprises a "⊓"-shaped main body with an opening facing forward, and a retaining strip detachably mounted on a front end of the main body; inserting slots are provided on an inner circumference of the top frame and communicated with each other; the top panel is correspondingly inserted into the inserting slots around the top frame;

the top panel is configured to be inserted or removed from the inserting slots when the retaining strip is removed.

4. The folding breeding box according to claim 3, wherein a first threaded hole is provided at each of four corners of the top frame; a second threaded hole corresponding to the first threaded hole is provided at each of four corners of the top panel; each of the first threaded holes and the second threaded hole corresponding thereto are connected by bolts.

5. The folding breeding box according to claim 1, wherein the positioning frame is mounted around the top panel; at least one hook with elasticity for deformation is provided on the front and rear sides of the positioning frame respectively; the positioning frame abuts against a circumference of the top frame, and is hooked on the top frame by a hooking part of each hook; the hook is configured to be released by pushing a top of the hook.

6. The folding breeding box according to claim 5, wherein a lower end of an inner side of the circumference of the top frame is used as a limit strip; the limit strip abuts against a circumference of the positioning frame, and the hook part of the hook is correspondingly hooked on a bottom of the limit strip.

7. The folding breeding box according to claim 1, wherein the folding breeding box further comprises a first front panel and a second front panel; upper and lower ends of outer sides of the first front panel and the second front panel are respectively hinged to the top frame and the base on the front sides thereof, so that the first front panel and the second front panel are reversible back and forth for opening state or locking state.

8. The folding breeding box according to claim 7, wherein a mechanical lock that is used to lock or unlock the first front panel and the second front panel is further provided on the base, so as to facilitate the locking state or opening state of the first front panel and the second front panel.

9. The folding breeding box according to claim 1, wherein there are two rear panels; a connecting strip with slots on both sides is provided between the two rear panels; one sides of the two rear panels are inserted into two corresponding slots of the connecting strip respectively, and a lower end of the connecting strip is detachably inserted into a positioning slot of the base.

\* \* \* \* \*